United States Patent [19]

Niimi et al.

[11] 4,069,284
[45] Jan. 17, 1978

[54] ANTI-VIBRATION HEAT-INSULATION STRUCTURE AND A PROCESS FOR PRODUCTION THEREOF

[75] Inventors: Itaru Niimi, Nagoya; Yasuhisa Kaneko, Toyota; Fumiyoshi Noda, Toyota; Yuji Watanabe, Toyota, all of Japan

[73] Assignee: Toyota Jidosha Kogyo Kabushiki Kaisha, Toyota, Japan

[21] Appl. No.: 325,415

[22] Filed: Jan. 22, 1973

[30] Foreign Application Priority Data

Jan. 20, 1972 Japan .................... 47-7861

[51] Int. Cl.$^2$ ........................... B29H 7/20
[52] U.S. Cl. ...................... 264/43; 106/75; 106/DIG. 2; 106/DIG. 3; 264/46.5; 428/310
[58] Field of Search ............... 264/42, 43, 46.5; 161/161, 168, 139; 106/75, DIG. 3, DIG. 2; 138/149

[56] References Cited

U.S. PATENT DOCUMENTS

| | | | |
|---|---|---|---|
| 1,921,468 | 8/1933 | Jack | 106/75 X |
| 2,462,255 | 2/1949 | Charman et al. | 106/DIG. 2 |
| 3,203,813 | 8/1965 | Gajardo et al. | 106/DIG. 2 |
| 3,419,495 | 12/1968 | Weldes et al. | 106/DIG. 2 |
| 3,709,772 | 1/1973 | Rice | 161/139 |

*Primary Examiner*—Joan E. Welcome
*Attorney, Agent, or Firm*—Stevens, Davis, Miller & Mosher

[57] ABSTRACT

The present invention relates to an anti-vibration heat-insulation structure and a process for the production thereof characterized by filling the void in the structure to form a heat-insulation layer with silicic acid bonding agent-coated silicic acid mineral grains which swell in volume when fired at a high temperature; and then heating and thereby expanding these silicic acid mineral grains and at the same time allowing said grains to stick to one another.

5 Claims, 3 Drawing Figures

ANTI-VIBRATION HEAT-INSULATION STRUCTURE AND A PROCESS FOR PRODUCTION THEREOF

BACKGROUND OF THE INVENTION

The conventional heat-insulation structure which has been used in automobiles under the conditions of vibrational stress and high temperatures of over 500° C, represents a structure using a ceramic fiber (of $Al_2O_3$-$SiO_2$ base mineral) as the heat-insulation material. In long service under vibration, however, such a structure gets pulverized with its heat-insulation layer shrunk and its heat-insulation performance seriously reduced. Meanwhile, the filling of a 2–4$_{mm}$ void with ceramic fiber has been technically and economically controversial. These are the points for which an improvement has been demanded.

For application under low temperatures (less than 80° C), a heat-insulation double tube made of polystyrol resin has been invented for mass production of heat-insulation tubes for low-temperature service. Being aimed not at anti-vibration, but at low manufacturing, cost, this invention has the drawback of being inferior in resistance to heat and vibration.

Thus, there is no anti-vibration heat-insulation structure known that can serve under high temperatures.

SUMMARY OF THE INVENTION

The present invention relates to the manufacturing process of an anti-vibration heat-insulation structure that can serve under high temperatures of over 500° C; in this manufacturing process a bonding agent of the silicic acid base is preliminarily applied on the surface of silicic acid mineral grains with resistance to high temperatures which can swell in volume when fired at high temperatures; these grains are used to fill the void in the structure to form a heat-insulation layer; and they are heated to expand and at the same time to stick to one another, thereby producing an anti-vibration heat-insulation structure for high temperature service.

BRIEF DESCRIPTION OF THE ATTACHED DRAWINGS

FIG. 1 is a schematic diagram showing an automobile exhaust pipe having an anti-vibration high temperature-insulating structure, FIG. 2 indicates the position for mounting the exhaust pipe illustrated in FIG. 1, FIG. 3 is a schematic diagram showing an engine and exhaust pipe equipped with a manifold reactor having said high temperature-insulating structure.

DETAILED DESCRIPTION OF THE INVENTION

The present invention relates to an anti-vibration heat-insulation structure for service at high temperatures of over 500° C which does not pulverize or break under vibrational stress such as occurs in automobiles; and to its manufacturing process.

In the manufacture of an anti-vibration heat-insulation double tube of the present invention, a mere process of foaming with use of vermiculite, perlite or black lava glass is not capable of producing the necessary anti-vibration characteristic.

The present invention relates to the manufacturing process of an anti-vibration heat-insulation structure characterized by spreading a bonding agent of silicic acid base such as colloidal silica, water glass or a ternary mineral of alumina - silica - zirconia on the surface of grains of a mineral of silicic acid base which swells in volume when fired at high temperatures, such as vermiculate, perlite or black lava glass; heating and drying these grains; filling a part of the void in a structure to form the heat-insulation layer with these dried mineral grains; then heating said structure to a temperature over the softening point in a non-oxidizing atmosphere to make said grains stick together as well as expand in volume.

The structure produced in accordance with the process of the present invention can maintain a satisfactory state of heat-insulation for a long period of time without pulverizing or breaking even in service conditions subjected to high vibrational stress.

Besides, the structure produced by the invented process has the following merits:

1. It does not pulverize even under vibration, because it is produced with use of a heat-resistant in organic bonding agent which causes expansion and cohesion of the silicic acid mineral grains of a swelling nature which are liable to break and pulverize under vibration.

2. It can be produced at a material cost which is about 1/10 of the cost needed with use of the conventional ceramic fiber.

3. The heat-insulation can evenly fill the narrow void therein which could never be filled up with a foamed ceramic.

The following are some examples illustrating an actual manufacturing of the structure of this invention.

EXAMPLE 1

Figure 1:
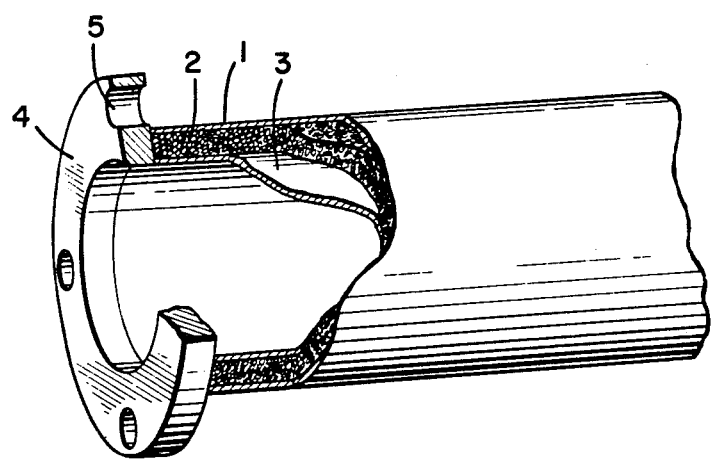

Coarse grains of vermiculite, 1–3mm in size and colloidal silica were blended in a volume ration of 50:50. The blending was agitated for 30 minutes in an agitator to mix the two elements. The obtained mixture was screened to separate an excess of colloidal silica from the vermiculite grains coated with said colloidal silica. The vermiculite grains thus coated with colloidal silica were dried at 100° C for 4 hours. The colloidal silica-conted vermiculite grains thus obtained were introduced from the end of a double exhaust pipe as indicated in FIG. 1 to fill the void between the outer pipe 1 and the inner pipe 2 up to ¼ of its volume and were spread out nearly even in the longitudinal direction. Next, this exhaust pipe changed with said colloidal silica-coated verculite grains was held for one hour in an argon atmosphere within a furnace heated to 1000° C, thereby expanding said verculite grains in volume and at the sametime sintering them together. In this manner a heat-insulation double pipe could be produced. It is for the purpose of preventing an oxidation of the metallic parts that the pipe is heated in an argon atmosphere FIG. 1 is a partially exploded oblique view of a heat-insulation double pipe with the heat-insulation layer formed therein, in which 1 is the outer pipe; 2 is the inner pipe; 3 is the heat-insulation layer formed in accordance with the present invention; 4 is a flange; and 5 is a bolt hole for fixing the flange.

Figure 2:
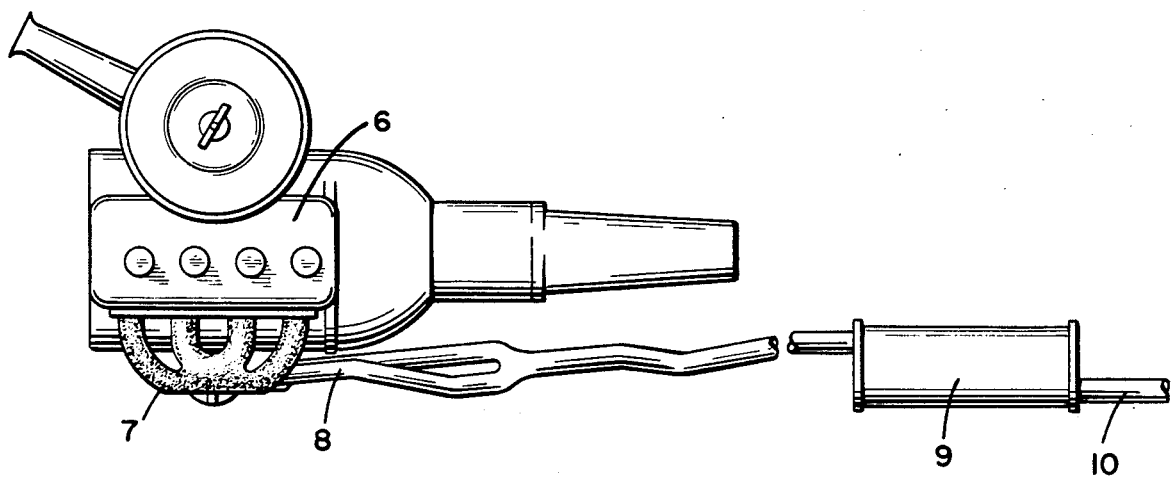

A double pipe thus produced was mounted at 8 in FIG. 2, i.e., the position for fitting the exhaust pipe. After the vehicle thus equipped had run 7,500km over bad roads, said exhaust pipe was taken off to observe the heat-insulation layer at the three spots in the longitudinal direction, but nothing wrong was found with said heat-insulation layer.

In FIG. 2, 6 is the engine; 7 is the exhaust manifold; 9 is the catalyst converter; and 10 is the exhaust pipe.

The bulk density of the heat-insulation layer in the above example turned out 0.19 g/cm$^3$ and its heat conductivity turned out 0.15 Kcal/m.h.°c (900° C).

EXAMPLE 2

Kaolin and Zircon were mixed at 50:50 (weight %) to be heated to react at 1200° C for 5 hours. The product was crushed to less than 400 mesh in a ball-mill. A solution of polymetacrylic acid methylzicroethane and 30% in weight of the powder thus obtained were blended to produce a slurry.

This slurry and vermiculite grains, 1-3mm in size, were blended and mixed for 30 minutes in a mixer. The resultant mixture was screened and then treated in the same manner as in Example 1 to produce vermiculite grains coated with a ternary mineral bonding agent of alumina-silica-zirconia. These grains were charged into a double exhaust pipe in the same manner as in Example 1; placed in an argon atmosphere within a furnace at 1000° C and held there for 1 hour to allow them to expand and sinter together. The bulky density of the heat-insulation layer thus obtained was 0.31 g/cm$^3$ and its heat conductivity 0.21 kcal/m.h.°c (100° C).

The heat-insulation double pipe thus obtained was submitted to the same durability test as in Example 1, split into three sections in the longitudinal direction for checking, which revealed, however, no pulverization nor shrinkage in the heat-insulation layer.

EXAMPLE 3

Perlite, 1-25mm in size and colloidal silica were blended in a ratio (weight %) of 50:50 to be mixed by agitation, after which, in the same manner as in Example 1, the colloidal silica was removed. Then, the mixture was dried at 100° C for 4 hours and thereafter charged into the void 3 in the heat-insulation double pipe indicated in FIG. 1 up to 1/6 of its volume and said pipe was held for 1 hour in furnace at 1170° C to allow the charged substance to expand and sinter.

The bulk density of the heat-insulation layer was 0.19 g/cm$^3$ and its heat conductivity 0.17 Kcal/m.h.°c (1000° C).

A heat-insulation double exhaust pipe thus produced was mounted on an automobile as in Example 1 and submitted to 12,000 Km running over bad roads, after which the inside of said pipe was checked. The inspection revealed merely a slight pulverization at the contact between flange and heat insulator.

EXAMPLE 4

Figure 3:
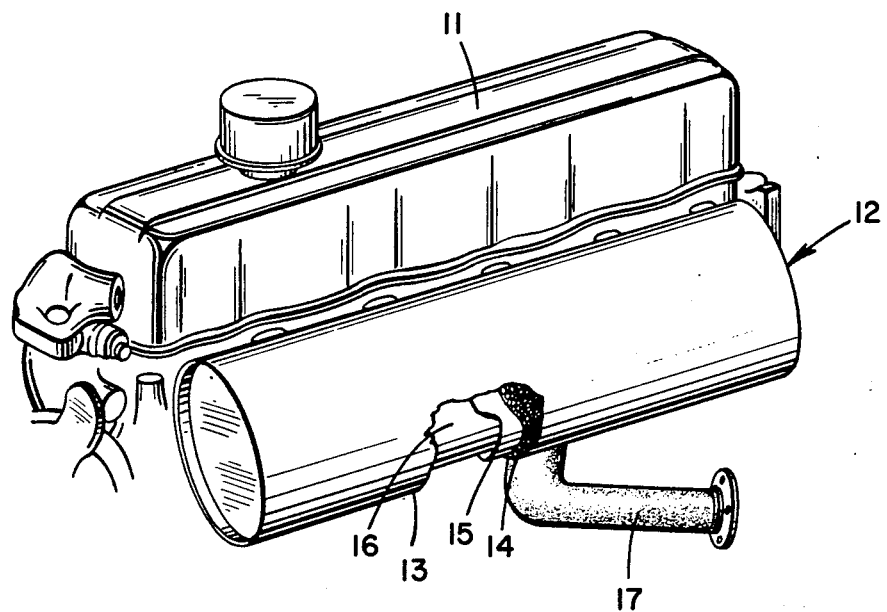

In a similar process as Examples 2 and 3, the heat-insulation layer 15 for a manifold reactor as illustrated in FIG. 3, was formed and put to a durability test of 7,300 Km run over bad roads, after which said heat-insulation layer exhibited hardly any pulverization or shrinkage.

In FIG. 3, 11 is the engine; 12 is the manifold reactor, 13 is the outer pipe; 15 is the inner pipe; 16 is the inner core; and 17 is the exhaust pipe.

COMPARISON 1

The heat-insulation layer 14 of the manifold reactor illustrated in FIG. 3 was filled with ceramic fiber and put to the same durability test as in Example 4. As a result, the layer had been heavily pulverized; ceramic fiber had flown into the exhaust pipe and the manifold reactor through a gap in the weld; and about 20% of the void in the heat-insulation layer had become vacant. The ceramic fiber scattered in the exhaust gas rendered the valve for exhaust gas recirculation located behind the exhaust pipe (on the tail side) incapable of functioning.

COMPARISON 2

Vermiculite grains were charged into the void 3 of the heat-insulation double pipe illustrated in FIG. 1 up to ¼ of the volume of said pipe and then held for 1 hour within a furnace at 1,000° C to allow said grains to swell in volume. A double pipe equipped with heat-insulation layer of three volume-swollen vermiculite grains was mounted on an automobile as in Example 1 and submitted to a 3,000 km run. Internal checking after the run revealed that said layer had been pulverized to an extent of 15% and developed a gap on one side.

The bulk density of this heat-insulation layer was 0.15 g/cm$^3$ and its heat conductivity 0.14 Kcal/m.h.°c.

What is claimed is:

1. A process of manufacturing a vibration resistant heat insulator comprising,
    coating foamable silicic acid mineral grains with a bonding agent,
    charging said coated mineral grains into a space between two spaced walls,
    and heating said coated mineral grains until they are expanded and bonded together by said bonding agent which strengthens the expanded mineral grains.

2. The process of claim 1 wherein said silicic acid mineral grains comprises a member selected from a group consisting of vermiculite, perlite and black lava glass.

3. The process of claim 1 wherein said bonding agent comprises a member selected from a group consisting of colloidal silica, water glass and a ternary mineral of alumina-silica-zirconia.

4. The process of claim 1 wherein said coating step further comprises
    mixing silicic acid mineral grains and bonding agent,
    agitating said mixture and
    screening said mixture to thereby remove the excess bonding agent.

5. The process of claim 1 wherein the coated mineral grains are heated to a temperature of from 1000° to 1200° C. until the grains are expanded and bound together.

* * * * *